UNITED STATES PATENT OFFICE.

THOMAS J. MAYALL, OF ROXBURY, MASSACHUSETTS.

IMPROVED MACHINE-BELTING.

Specification forming part of Letters Patent No 40,699, dated November 24, 1863; Reissue No. 1,627, dated March 8, 1864.

*To all whom it may concern:*

Be it known that I, THOMAS J. MAYALL, of Roxbury, in the county of Norfolk and State of Massachusetts, have invented certain new and useful Improvements in the Manufacture of Machine Belting or Banding; and I do hereby declare that the following description is a full and exact specification of the same, wherein I have set forth the nature and principles of my said improvements, whereby my invention may be distinguished from all others of a similar class, together with such parts as I claim and desire to have secured to me by Letters Patent.

In the manufacture and use of driving-bands or belting for machinery it has been found that the two principal kinds, leather and rubber, have their advantages and disadvantages according to the purpose for which they are used and the circumstances under which they are run. Thus, for instance, a leather belt or band will endure friction when used as a cross-belt and a rubber one will not, and, on the contrary, a rubber belt can be run through water, while a leather belt would be saturated and injured thereby. Again, a rubber belt is damaged by being subjected to the action of oil, whereas a belt made of leather or gutta-percha is free from this injurious effect under like circumstances. Lastly, a belt made of leather, when exposed to heat, becomes dry and stiff. A rubber belt or band is free from this objection, as it is more pliable and yielding, because of its great elasticity. The ingredients of the compound are fibers of leather, india-rubber, and gutta-percha separately or combined with litharge or other metallic oxides and sulphur in the following proportions, when subjected to artificial heat, as hereinafter described. The proportions of the said ingredients are as follows: Four pounds of the fibers of leather, one pound of india-rubber or gutta-percha, separately or combined, two pounds of litharge or other metallic oxides, and two ounces of sulphur are to be mixed together by a process well known to manufacturers of india-rubber or gutta-percha. After the mixture has been spread upon cloth or run into sheets by calendering-rolls or any other means known to manufacturers of india-rubber or gutta-percha, it is subjected to quick vulcanization between metal plates, also well known to manufacturers of india-rubber.

The proportions of the ingredients specified may be varied to increase or diminish the flexibility of the article intended to be produced, though oxides of metals, white lead or zinc, calcined French chalk or lime, or a carbonate or sulphate of magnesia, or other magnesian earths may be used without litharge. In the compound the use of litharge alone is preferred.

What I claim as my invention, and desire to secure by the grant of Letters Patent, is—

The combination of fibers of leather with sulphur, india-rubber, or gutta-percha separately or combined with litharge or other metallic oxides, with or without the use of any of the other ingredients mentioned in the specification, when the compound is subjected to artificial heat to produce the product, as herein described.

THOS. J. MAYALL.

Witnesses:
JOSEPH GAVETT,
ALBERT W. BROWN.